United States Patent
Zhu et al.

(10) Patent No.: US 11,387,724 B2
(45) Date of Patent: Jul. 12, 2022

(54) DUAL-ROTOR ELECTRIC MACHINE

(71) Applicant: ROLLS-ROYCE plc, London (GB)

(72) Inventors: Ziqiang Zhu, Derby (GB); Huayang Li, Derby (GB); Ellis F H Chong, Derby (GB)

(73) Assignee: ROLLS-ROYCE PLC, London (GB)

( * ) Notice: Subject to any disclaimer, the term of this patent is extended or adjusted under 35 U.S.C. 154(b) by 250 days.

(21) Appl. No.: 16/720,378

(22) Filed: Dec. 19, 2019

(65) Prior Publication Data

US 2020/0227988 A1    Jul. 16, 2020

(30) Foreign Application Priority Data

Jan. 14, 2019   (GB) ........................................ 1900478
Jan. 30, 2019   (GB) ........................................ 1901290

(51) Int. Cl.

| | |
|---|---|
| *H02K 16/02* | (2006.01) |
| *H02K 3/28* | (2006.01) |
| *B64D 27/24* | (2006.01) |
| *B64C 11/46* | (2006.01) |
| *B64D 35/02* | (2006.01) |

(52) U.S. Cl.
CPC .............. *H02K 16/02* (2013.01); *B64C 11/46* (2013.01); *B64D 27/24* (2013.01); *B64D 35/02* (2013.01); *H02K 3/28* (2013.01)

(58) Field of Classification Search
CPC ......... H02K 16/00; H02K 16/02; H02K 1/246
USPC ................................ 310/156.37, 114, 154.33
See application file for complete search history.

(56) References Cited

U.S. PATENT DOCUMENTS

| | | | |
|---|---|---|---|
| 2007/0029893 A1* | 2/2007 | Schuler ................ | B60N 2/2254 310/239 |
| 2011/0057456 A1* | 3/2011 | Atallah ................ | H02K 49/102 290/10 |
| 2013/0181562 A1 | 7/2013 | Gieras et al. | |

(Continued)

FOREIGN PATENT DOCUMENTS

| | | |
|---|---|---|
| EP | 1 350 665 A2 | 10/2003 |
| EP | 1351374 | 10/2003 |

(Continued)

OTHER PUBLICATIONS

European search report dated May 15, 2020, issued in EP Patent Application No. 19216661.

(Continued)

*Primary Examiner* — Jose A Gonzalez Quinones
(74) *Attorney, Agent, or Firm* — Crowell & Moring LLP

(57) ABSTRACT

The dual rotor electric machine comprises: a stator having one or more slots and one or more stator windings. The dual rotor electric machine further comprises a first rotor arranged to rotate relative to the stator with an airgap therebetween. The first rotor comprises a first rotor excitation element having one or more magnetic pole pairs arranged to interact with the stator windings, the first rotor configured to rotate about an axis (X). The dual rotor electric machine further comprises a second rotor arranged to rotate relative to the stator with an airgap therebetween. The second rotor comprises a second rotor excitation element having one or more magnetic pole pairs arranged to interact with the stator windings, the second rotor being configured to rotate about the axis (X).

17 Claims, 5 Drawing Sheets

(56) References Cited

U.S. PATENT DOCUMENTS

| | | |
|---|---|---|
| 2013/0277976 A1 | 10/2013 | Koenig |
| 2017/0117784 A1 | 4/2017 | Guo et al. |
| 2020/0227966 A1 | 7/2020 | Harvey et al. |

FOREIGN PATENT DOCUMENTS

| | | | | |
|---|---|---|---|---|
| EP | 2613033 | | 7/2013 | |
| GB | 2534196 | | 7/2016 | |
| GB | 2558660 | | 7/2018 | |
| JP | 2012239339 A | | 12/2012 | |
| JP | 2013106492 | | 5/2013 | |
| JP | 2013106492 A | * | 5/2013 | ............ H02K 16/02 |
| JP | 2013121215 A | | 6/2013 | |
| JP | 2017169287 A | * | 9/2017 | |
| WO | WO-9939426 A1 | | 8/1999 | |
| WO | 030840432 | | 10/2003 | |
| WO | 2018054483 | | 3/2018 | |

OTHER PUBLICATIONS

European search report dated May 25, 2020, issued in EP Patent Application No. 19216663.

Great Britain search report dated Jun. 26, 2019, issued in GB Patent Application No. 1900478.7.

Great Britain search report dated Jul. 9, 2019, issued in GB Patent Application No. 1901290.5.

Tutelea, et al., "Optimal Design of Rotor Single Stator PMSM Drive for Automobiles", (2012) IEEE International Electric Vehicle Conference.

Boldea, et al., "Dual Rotor Single-Stator Axial Air Gap PMSM Motor/Generator Drive for HEVs: A Review of Comprehensive Modeling and Performance Characterization," (2012) Conference ESARS.

Topor, et al., "Singe Stator Dual PM Rotor Symnchronous Machine with two-frequency single-inverter control, for the propulsion of hybrid electricvehicles," (2017) MATEC Web of Conferences, 125, 02065 CSCC.

* cited by examiner

DUAL-ROTOR ELECTRIC MACHINE

CROSS-REFERENCE TO RELATED APPLICATIONS

This application is based upon and claims the benefit of priority from British Patent Application No. GB1900478.7 filed on 14 Jan. 2019 and British Patent Application No. GB1901290.5 filed on 30 Jan. 2019, the entire contents of which are incorporated by reference.

BACKGROUND

Technical Field

The present disclosure relates to a dual-rotor electric machine. The present disclosure also relates to an aircraft propulsion system comprising the dual-rotor electric machine.

Description of the Related Art

In the pursuit of reduced fuel burn and/or other emissions, electric aircraft systems are being developed. In an electric aircraft propulsion system, a ducted fan or open rotor propeller is driven by an electric motor by electrical power provided from one or both of a battery and a prime mover such as an internal combustion engine driven electrical generator. Where the electric power for the electric motors is provided by an internal combustion engine, such a system is known as a "hybrid electric propulsion system".

In one known example, an electric aircraft propulsion system has first and second co-axial propulsors in the forms of fans or open rotor propellers. In order to provide improved performance of the electric propulsion system, dual-rotor electric machines having a high torque and/or power density are required.

According to a first aspect there is provided a dual-rotor electric machine comprising: a stator having one or more slots and one or more stator windings; a first rotor arranged to rotate relative to the stator with an insulating gap therebetween, the first rotor comprising a first rotor excitation element having one or more magnetic pole pairs arranged to interact with the stator windings, the first rotor configured to rotate about an axis; a second rotor arranged to rotate relative to the stator with an insulating gap therebetween, the second rotor comprising a second rotor excitation element having one or more magnetic pole pairs arranged to interact with the stator windings, the second rotor being configured to rotate about the axis, wherein one or both of the first and second rotor excitation elements comprises a permanent magnetic material, the number of magnetic pole pairs on the first rotor is different from the number of magnetic pole pairs on the second rotor, and the first rotor is arranged to rotate about the axis in an opposite direction and at a different speed to the second rotor.

By providing a permanent magnet electric machine with different numbers of magnetic pole pairs on the first rotor compared to the second rotor, the electric machine may use different magnetic field spatial harmonics to provide interaction between the rotors and windings. For example, a fundamental armature field spatial harmonic may be used to interact with one rotor and a higher order armature field spatial harmonic resulting from the slotted stator may be used to interact with the other rotor. The permanent magnet dual-rotor electric machine may be beneficial to improve the torque or power density. Although the two rotors have different rotational speeds and direction, they may be controlled using only one signal converter to control the power transmission, rather than separate signal converters for each rotor.

The first rotor excitation element may be arranged to interact with the stator windings via a first rotor magnetic field in the insulating gap between the first rotor and the stator. The second rotor excitation element may be arranged to interact with the stator windings via a second rotor magnetic field in the insulating gap between the second rotor and the stator. The magnetic fields in each of the airgaps may have a plurality of spatial frequency components. The interaction between the first rotor excitation element and the stator windings may be via a first spatial frequency component, and the interaction between the second rotor excitation element and the stator windings may be via a second spatial frequency component. The first spatial frequency component may have a different frequency to the second spatial frequency component.

The first spatial frequency component may be a spatial harmonic order of the magnetic field corresponding to the number of pairs of magnetic poles on the first rotor; and the second spatial frequency component may be a spatial harmonic order of the magnetic field corresponding to the number of pairs of magnetic poles on the second rotor.

Either of the first or the second spatial frequency components may correspond to a spatial harmonic of the respective magnetic field resulting from the distribution of stator windings around the stator, the position of each stator winding, and/or the number of turns in each winding (e.g. in the case of a polyphaser winding). This spatial harmonic may be a fundamental harmonic. The other of the first or second spatial frequency components may correspond to a higher order spatial harmonic of the respective magnetic field, the higher order harmonic resulting from the distribution of slots formed in the stator.

The number of pairs of magnetic poles on the second rotor may be greater than the number of pairs of magnetic poles on the first rotor. The first rotor may be arranged to rotate about the axis at a greater speed compared to the second rotor.

The number of slots in the stator, Z, the number of magnetic pole pairs on the first rotor, $p_o$, and the number of magnetic pole pairs on the second rotor, $p_i$, may be given by the expression $|p_o \pm p_i| = Z$.

The stator may comprise an outer set of teeth extending radially from an outer surface of the stator, wherein the slots may comprise an outer set of slots defined by circumferential gaps between the outer set of teeth.

Each of the outer set of teeth may have a corresponding central radial axis extending from the outer surface of the stator, and the outer set of slots may have a slot size ratio defined by the angle (e.g. angular gap) between the edges of the outer set of teeth and the angle (e.g. angular spacing) between the radial axes of the outer set of teeth.

The slot size ratio may be set to maximise the relative strength of the frequency component of the magnetic field via which the second rotor excitation element and the stator windings interact.

The slot size ratio may be defined by the angle between each of the outer set of teeth divided by the angle between the radial axes of the outer set of teeth. The slot size ratio may be in a range between 0.2 and 0.8. The slot size ratio may be 0.6.

The first rotor may be located at least partially within the stator and the second rotor may at least partially surround the stator. The rotors and stator may therefore be nested within each other. This may allow a radial magnetic field configuration.

The first rotor and the second rotor may be arranged on either side of the stator in a direction along the axis of rotation. This may allow an axial magnetic field configuration.

One or both of the first and second rotor excitation elements may comprises one or more permanent magnet elements.

The one or more stator windings may comprise a plurality of polyphaser windings of electrically conducting wires.

The first rotor, the second rotor and the stator may act as two separate generators.

The first rotor, the second rotor and the stator may act as two separate motors.

One of the first rotor and the stator, or the second rotor and the stator, may act as a generator and the other of the first rotor and the stator, or the second rotor and the stator, may act as a motor.

According to a second aspect, there is provided a dual-rotor electric machine, comprising:

a stator having one or more slots and one or more stator windings;

a first rotor arranged to rotate relative to the stator with an insulating gap therebetween, the first rotor comprising a first rotor excitation element having one or more magnetic pole pairs arranged to interact with the stator windings, the first rotor configured to rotate about an axis;

a second rotor arranged to rotate relative to the stator with an insulating gap therebetween, the second rotor comprising a second rotor excitation element having one or more magnetic pole pairs arranged to interact with the stator windings, the second rotor being configured to rotate about the axis, wherein one or both of the first and second rotor excitation elements comprises a permanent magnetic material, wherein the first rotor excitation element is arranged to interact with the stator windings via a first rotor magnetic field in the insulating gap between the first rotor and the stator, and the second rotor excitation element is arranged to interact with the stator windings via a second rotor magnetic field in the insulating gap between the second rotor and the stator, and wherein the first rotor excitation element interacts with the stator via a different magnetic field spatial harmonic compared to the interaction between the second rotor excitation element and the stator such that the first rotor is arranged to rotate about the axis in an opposite direction and at a different speed to the second rotor.

The magnetic field spatial harmonic via which the first rotor excitation element and stator winding interact may be a magnetic field spatial harmonic resulting from the distribution of stator windings around the stator. The magnetic field spatial harmonic via which the second rotor excitation element and the stator winding interact may be a magnetic field spatial harmonic resulting from the distribution of the slots formed in the stator.

According to a third aspect, the present disclosure provides an aircraft propulsion system comprising: first and second propulsors; and the dual-rotor electric machine according to the first or second aspect, wherein one of the first and second rotors is coupled to one of the first and second propulsors, with the other of the first and second rotors coupled to the other of the first and second propulsors whereby the electric machine is configured to drive the first and second propulsors.

Any of the features of the statements above may be used in combination with the first or second aspect or third aspect.

In the above aspects the dual-rotor electric machine is a permanent magnet dual rotor electric machine in which one or both of the rotors comprise a permanent magnetic material. In other aspects, neither of the rotors may include a permanent magnetic material, with other types of excitation element (e.g. wound-field type rotors, reluctance type rotors, etc.) being used.

According to a fourth aspect, there is provided a dual-rotor electric machine, comprising: a stator having one or more slots and one or more stator windings; a first rotor arranged to rotate relative to the stator with an insulating gap therebetween, the first rotor comprising a first rotor excitation element having one or more magnetic pole pairs arranged to interact with the stator windings, the first rotor configured to rotate about an axis; a second rotor arranged to rotate relative to the stator with an insulating gap therebetween, the second rotor comprising a second rotor excitation element having one or more magnetic pole pairs arranged to interact with the stator windings, the second rotor being configured to rotate about the axis, the number of magnetic pole pairs on the first rotor is different from the number of magnetic pole pairs on the second rotor, and the first rotor is arranged to rotate about the axis in an opposite direction and at a different speed to the second rotor.

According to a fifth aspect, there is provided a dual-rotor electric machine, comprising:

a stator having one or more slots and one or more stator windings;

a first rotor arranged to rotate relative to the stator with an insulating gap therebetween, the first rotor comprising a first rotor excitation element having one or more magnetic pole pairs arranged to interact with the stator windings, the first rotor configured to rotate about an axis;

a second rotor arranged to rotate relative to the stator with an insulating gap therebetween, the second rotor comprising a second rotor excitation element having one or more pole pairs arranged to interact with the stator windings, the second rotor being configured to rotate about the axis, wherein the first rotor excitation element is arranged to interact with the stator windings via a first rotor magnetic field in the insulating gap between the first rotor and the stator, and the second rotor excitation element is arranged to interact with the stator windings via a second rotor magnetic field in the insulating gap between the second rotor and the stator, and wherein the first rotor excitation element interacts with the stator via a different magnetic field spatial harmonic compared to the interaction between the second rotor excitation element and the stator such that the first rotor is arranged to rotate about the axis in an opposite direction and at a different speed to the second rotor.

Any of the features disclosed above in connection with the first and second aspect may be used in combination with the fourth and/or fifth aspect.

According to a sixth aspect, there is provided an aircraft propulsion system comprising: first and second propulsors; and the dual-rotor electric machine according to the fourth or fifth aspect, wherein one of the first and second rotors is coupled to one of the first and second propulsors, with the other of the first and second rotors coupled to the other of the first and second propulsors whereby the electric machine is configured to drive the first and second propulsors.

According to a seventh aspect, there is provided a method of operating a dual-rotor electric machine, comprising: providing a dual-rotor electric machine according to any of the above aspects; and injecting a current into the stator windings or applying torque to the first and second rotors such that the first rotor is arranged to rotate about the axis in an opposite direction and at a different speed to the second rotor.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

With reference to FIG. 1, an aircraft 1 is shown having a propulsion system 2. The propulsion system 2 is shown in further detail in FIG. 2, and is in the form of a ducted fan, having first and second propulsors in the form of first and second fans 10a, 10b. Each fan 10a, 10b is enclosed within a fan duct 21, and is mounted to a core nacelle 25. The fans 10a, 10b are driven by a dual-rotor electric machine 12 via drive shafts 14 and 16. The dual rotor electric machine 12 is supplied with electric power from a power source. In the present embodiment, the power source comprises a gas turbine engine 4, which drives a generator 10. An additional or alternative power source in the form of one or more chemical batteries 8 is also provided. In other embodiments, the first and second propulsors may be in the form of first and second open rotors. In that case the fan duct 21 is absent.

Figure 1:
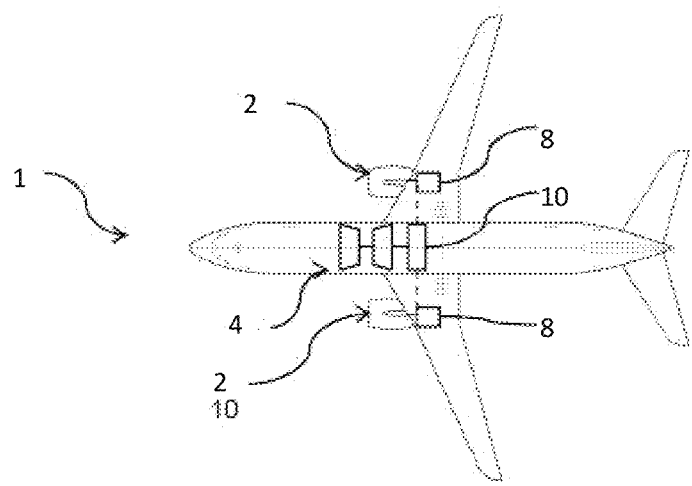
FIG. 1 is a plan view of an aircraft having a propulsion system.

The core nacelle 25 is coupled to the fan duct 21 by a plurality of struts in the form of outlet guide vanes 18. Each of the fans 10a, 10b comprises a plurality of blades carried by a central hub. The central hub of each fan is coupled to a respective one of the drive shafts 14 and 16 so that they can be driven by the electric machine 12. A gearbox 20 may be provided between the electric machine 12 and one or both of the drive shafts 14, 16. In the described embodiment, the gearbox 20 is provided between the electric machine 12 and the first propulsor 10a so that the drive shaft 14 can rotate at a different speed to the respective rotor of the electric machine 10a to which it is coupled via the gearbox 20. In other embodiments, a separate gearbox may be provided for each of the propulsors 10a, 10b. The first and second propulsors are driven by the electric machine such that they are arranged to contra-rotate in use in order to general forward thrust. In the described embodiments, the drive shafts 14, 16 extend from either side of the electric machine 12 in opposing directions such that the electric machine 12 is located between the propulsors in a direction along the airflow path through the propulsion system 2. In other embodiments, the drive shafts 14, 16 may extend from the same side of the electric machine 12 and in the same direction. In this case, both of the propulsors are on the same side of the electric machine 12.

Figure 3:
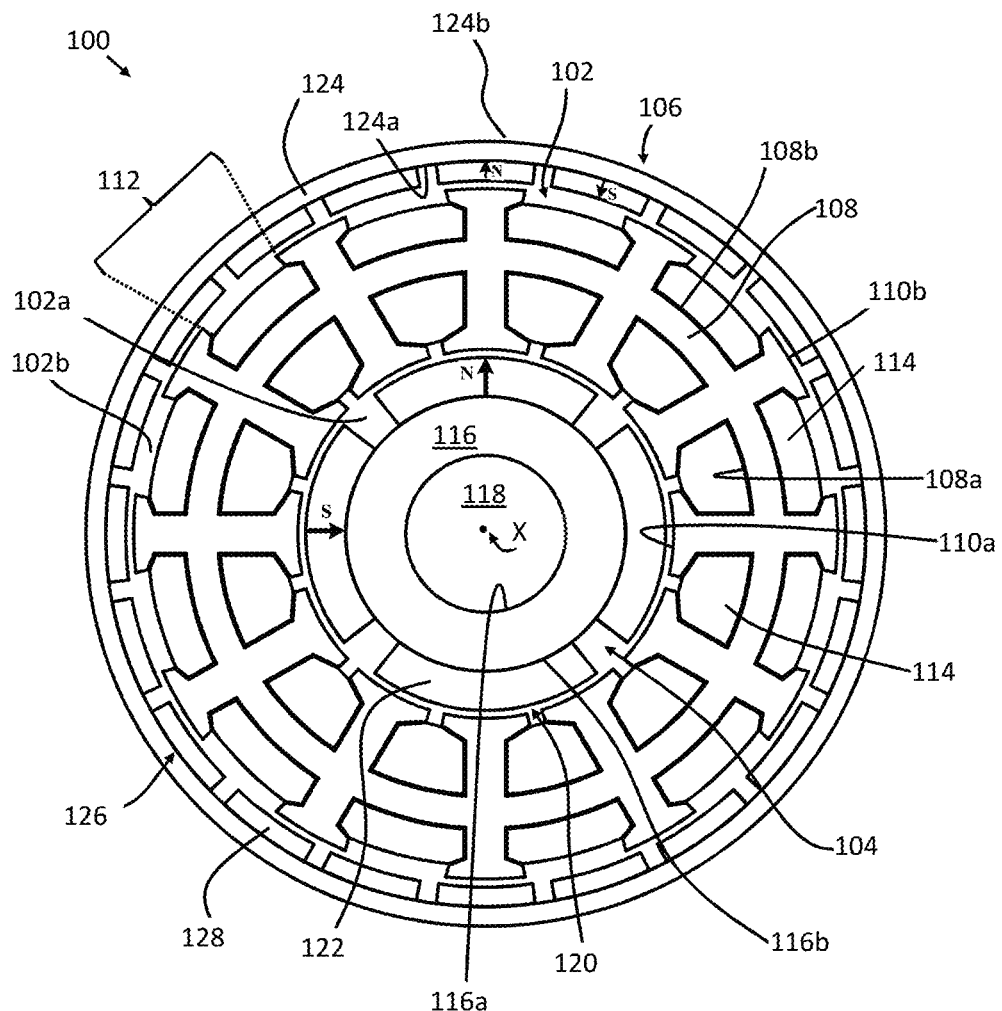
FIG. 3 shows a section view of a dual-rotor electric machine used in the propulsion system of FIG. 2.

A dual rotor electric machine 100 suitable for use in the propulsion system 10 is illustrated in FIG. 3. The electric machine 100 comprises a stator 102, a first rotor 104 and a second rotor 106. The stator 102 is held in a stationary position relative to the first and second rotors 104, 106, which are arranged to rotate around a central axis (labelled 'X' in FIG. 3) of the electric machine 100. The stator 102 may be nested between the first rotor 104 and the second rotor 106 so that they are concentrically aligned with the axis of rotation.

One of the first and second rotors 104, 106 is coupled to one of the first and second propulsors 10a, 10b, with the other of the first and second rotors 104, 106 coupled to the other of the first and second propulsors 10a, 10b so that the propulsors are driven by the electric machine 100. The rotors and propulsors may be connected directly or by a gearbox or other suitable drive linkage.

The stator 102 may be formed from a generally cylindrical yoke 108. The yoke 108 comprises an inner surface 108a and an outer surface 108b. The stator 102 comprises an inner set of teeth 110a extending radially inwardly from the inner surface 108a and an outer set of teeth 110b extending radially outwardly from the outer surface 108b. The inner and outer sets of teeth may be spaced equally around the circumference of the inner and outer surface of the stator 102. In the described embodiment, the inner and outer sets of teeth may be equal in number and circumferentially aligned with each other around the yoke 108. Other tooth geometries and distributions may however be possible. The stator 102 further comprises a plurality of slots 112 (or one or more slots in some embodiments) defined by the gaps between each of the teeth of the inner and outer sets 108a, 108b.

The stator 102 further comprises a plurality of stator windings 114 (or one or more in some embodiments). The stator windings may be formed by polyphaser windings of electrically conducting wires. The windings may be wrapped toroidally around the inner surface 108a and the outer surface 108b of the stator yoke 108. The stator windings may be located between each of the teeth 108a, 108b so that they are disposed within the slots 112. Other arrangements of stator winding are however possible.

The stator yoke 108 may be formed from a core made up of a plurality of stacked laminations. The stator yoke 108 may be made from forged iron, cast iron, soft magnetic composites (SMC), or any material with a suitably high permeability.

The first rotor 104 may be formed from a generally cylindrical rotor yoke 116 having an inner surface 116a and an outer surface 116b. The inner surface 108a of the stator may define an opening in which the first rotor 104 is received. The first rotor 104 is therefore located at least partially within the stator 102. The outer surface 116b of the first rotor 104 is spaced apart from inner surface 108a of the stator 102 (and from the radially distal ends of the inner set of teeth 110a) to form an insulating gap in the form of an airgap 102a between the first rotor 104 and the stator 102. By insulating gap we mean an insulating layer, which may comprise air or some other insulating fluid such as oil.

Figure 2:
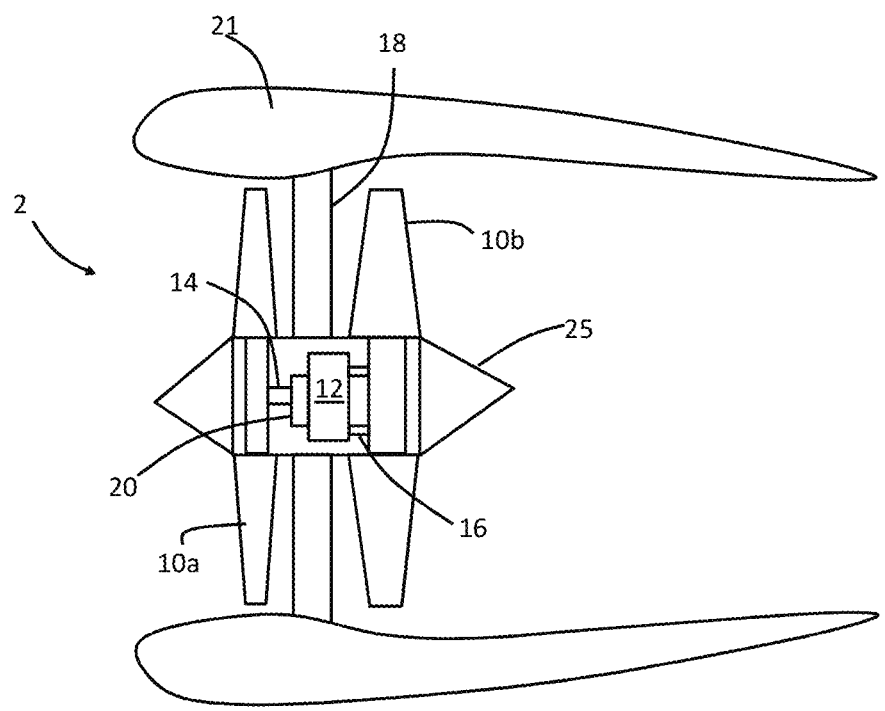
FIG. 2 is a sectional side view of a first aircraft propulsion system for the aircraft of FIG. 1.

The first rotor 104 may be coupled to a first shaft 118 that may be used as an output or input drive of the dual-rotor electric machine. The first shaft 118 may be used to drive rotation of one of the first and second propulsors of the propulsion system shown in FIG. 2.

The first rotor 104 further comprises a first rotor excitation element 120. The first rotor excitation element 120 comprises a plurality of magnetic pole pairs (or one or more pole pairs in other embodiments) that are arranged to interact with the stator windings 114. The poles of the first rotor excitation element 120 may alternate in polarity around the circumference of the rotor yoke 116. Each magnetic pole pair is therefore formed from a pair of poles having opposite polarity to each other. The polarity of one such pair of poles is labelled in FIG. 3 as north 'N' and south 'S' poles.

Figure 4:
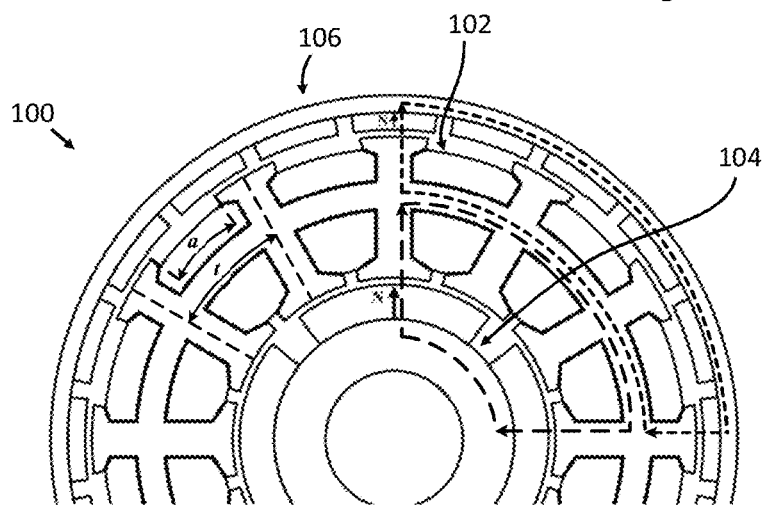
FIG. 4 shows a close up view of part of the electric machine shown in FIG. 3.

The first rotor excitation element 120 may comprise a permanent magnetic material. In the embodiment shown in FIG. 3, the first rotor excitation element 120 comprises a plurality of permanent magnet elements 122 arranged around the circumference of the first rotor 104. In other embodiments, a single permanent magnetic member may be provided having a plurality of magnetic poles in separate regions. The permanent magnet(s) may be radially polarised to form a radial magnetic field. The permanent magnet(s) may be mounted to the outer surface 116b of the first rotor 104 as shown in FIG. 4. In other embodiments, they may be embedded within the yoke 116 forming the first rotor 104 or inset into its surface 116a as will be described later.

The second rotor 106 is formed from a generally cylindrical rotor yoke 124 having an inner surface 124a and an outer surface 124b. The inner surface 124a may define a central opening in which the stator 102 is at least partially received so that the second rotor 102 at least partially surrounds the stator 102.

The inner surface 124a of the second rotor 106 may be spaced apart from the outer surface 108b of the stator 102 (and from the radially distal ends of the outer set of teeth 110b) to form an insulating gap in the form of an airgap 102b between the second rotor 106 and the stator 102.

The second rotor 106 comprises a second rotor excitation element 126 having a plurality of magnetic pole pairs (or one or more pole pairs in other embodiments). The second rotor excitation element 126 is also arranged to interact with the stator windings 114. The poles of the second rotor excitation element 126 may alternate in polarity around the circumference of the rotor yoke 124 in a similar manner to those of the first rotor 104. Each magnetic pole pair is again formed from a pair of poles having opposite polarity to each other. The polarity of one such pair of poles is labelled in FIG. 3.

The second rotor excitation element 126 may be similar to the first rotor excitation element 120. It may also comprise a permanent magnetic material. In the embodiment shown in FIG. 3, the second excitation element 126 comprises a plurality of permanent magnet elements 128 arranged around the circumference of the second rotor 104. In other embodiments, a single permanent magnetic member having a plurality of magnetic poles may be provided to form the second excitation element 126. The permanent magnet(s) may be radially polarised to form a radial magnetic field. The permanent magnet(s) may be mounted to the inner surface 124a of the second rotor 106 as shown in FIG. 3 in a similar manner to those of the first rotor 104. In other embodiments, they may be embedded within the second rotor yoke 124 or inset into its surface 124a.

The second rotor may be coupled to a second shaft (not shown in the figures) that rotates independently of the first shaft 118. Where the electric machine 100 acts at least partly as a generator, the second shaft may drive rotation of the second rotor 106. Where the electric machine 100 acts at least partly as a motor, the rotation of the second rotor 106 may drive rotation of the second shaft. The second shaft may be used to drive one of the first and second propulsors of the aircraft propulsion system of FIG. 2.

The second rotor 106 is configured to rotate about the same axis as the first rotor 104. The second rotor 106 is however configured to rotate, during operation of the electric machine, in an opposite direction and at a different speed compared to the first rotor 104. The first and second shafts to which the rotors are coupled are therefore also configured to rotate in opposite directions and at differing speeds.

The first rotor excitation element 120 is arranged to interact with the stator windings 114 via a first rotor magnetic field in the airgap 102a between the first rotor 104 and the stator 102. The second rotor excitation element 126 is arranged to interact with the stator windings 114 via a second rotor magnetic field in the airgap 102b between the second rotor 106 and the stator 102.

The first and second magnetic fields may arise because of the magnetic poles of the first and second excitation elements 120, 126, and a current carried by the stator windings 114. Interaction between either one of the rotor excitation elements 120, 126 and the stator windings 114 may cause relative rotation of the respective rotor 104, 106 when a current is passed through the stator windings 114 in the case of the electric machine 100 operating as a motor (e.g. when used in the aircraft propulsion system 2). Interaction between either one of the rotor excitation elements 120, 126 and the stator windings 114 may drive a flow of current in the stator windings 114 if the rotors 104, 106 are rotated relative to the stator 102 in the case of the electric machine 100 acting as a generator.

Each of the first and the second electric fields may have a magnetic flux density that varies spatially around the stator 102. The magnetic fields in each of the airgaps 102a, 102b may have a plurality of spatial frequency components. The magnetic flux density may vary such that each of the first and second magnetic fields have spatial frequency components (or harmonics) that correspond to different periodic spatial variations in the magnetic field occurring at different frequencies.

The interaction between the first rotor excitation element 120 and the stator winding 114 may be via a first spatial frequency component and the interaction between the second rotor excitation element 126 and the stator winding 114 may be via a second spatial frequency component. The first spatial frequency component may have a different frequency to the second spatial frequency component. This means that the first rotor excitation element 120 interacts with the stator 102 via a different magnetic field spatial harmonic compared to the interaction between the second rotor excitation element 126 and the stator 102. This may allow the first and second rotors 104, 106 to interact simultaneously with the stator winding 114, whilst rotating at different speeds and rotational directions to each other. This may provide an electric machine that has an improved torque or power density. Furthermore, only one signal converter may be required to control the power transmission from, or to, the stator windings 114 rather than requiring a separate signal converter for each rotor.

An example of the flux distributions of the first and second magnetic fields is illustrated in FIG. 4. FIG. 4 shows a close up view of part of the electrical machine 100 shown in FIG. 3. Corresponding reference numerals have therefore been used accordingly. The flux distributions are shown by broken lines representing flux paths running through the first rotor 104, the stator 102 and the second rotor 106. As can be seen in FIG. 4, the flux distributions of the first and second magnetic fields are independent of each other.

Either of the first or the second spatial frequency components may correspond to a fundamental spatial harmonic of the magnetic field. The fundamental harmonic may result from the distribution of stator windings around the stator. The fundamental spatial harmonic may have a frequency related to the number of stator windings and/or the position of each stator winding and/or the number of turns in each winding in the case of a polyphaser winding. By changing the allocation of the coils to each phase or the number of stator windings the fundamental spatial frequency harmonic may vary.

The other of the first or second spatial frequency components may correspond to a higher order frequency component and may therefore correspond to a higher order spatial harmonic of the magnetic field. The higher order spatial frequency component may be the result of the distribution of slots 112 formed in the stator 102. Because the magnetic/electric field can only pass through the stator teeth 110b, the slots 112 and adjacent stator teeth 110b form a unique flux path pattern. The fundamental spatial harmonic is then subjected to field modulation resulting from this flux path pattern, and higher order spatial harmonics arise.

In the embodiment shown in FIG. 3, the first rotor 104 is arranged to interact with the stator 102 via the fundamental spatial frequency field harmonic, whereas the second rotor 106 is arranged to interact with the stator 102 via the higher order spatial harmonic. In other embodiments, the second rotor 106 is arranged to interact with the stator 102 via the fundamental spatial frequency field harmonic, whereas the first rotor 104 is arranged to interact with the stator 102 via the higher order spatial harmonic.

To allow the first and second excitation elements 120, 126 to interact with the stator windings 114 using different magnetic field spatial frequency components the number of magnetic pole pairs on the first and second rotors 104, 106 may be chosen accordingly. The number of magnetic pole pairs on the first rotor 104 may be different from the number of magnetic pair poles on the second rotor 106. By changing the number of pairs of magnetic poles provided on each of the first and second rotors 104, 106 the frequency of spatial variation in the magnetic field they produce can be varied. This may allow them to interact with the stator via the desired magnetic field components.

For each of the first and second rotors 104, 106 an electrical frequency $f_{electrical}$ and a mechanical frequency $f_{mechanical}$ may be defined as:

$$f_{electrical} = n/60$$

$$f_{mechanical} = pn/60$$

where n is the rotational speed of the rotor (in rpm) and p is the pole-pair number. As the electrical frequency of both of the rotors is the same a single signal converter can be used for the stator windings. The mechanical frequency of each of the rotors will however be different, allowing outputs at different speeds to be provided by the electric machine.

The number of pairs of magnetic poles provided on the second rotor excitation element 126 may be greater than the number of pairs of magnetic poles provided on the first rotor excitation element 120. This may allow the second rotor element 120 to interact with the stator windings 114 via a magnetic field spatial frequency component that is higher in frequency compared to that via which the first rotor element 120 and the stator windings 114 interact. This may allow the first rotor to rotate about the axis at a different speed compared to the second rotor.

The number of slots in the stator, Z, the number of pairs of magnetic poles on the first rotor, $p_o$, and the number of pairs of magnetic poles on the second rotor, $p_i$, may be chosen to provide a suitable interaction between the different magnetic field frequency components described above. In the described embodiment, the number of slots in the stator, Z, the number of magnetic pole pairs on the first rotor, $p_o$, and the number of magnetic pole pairs on the second rotor, $p_i$ are given by the expression $|p_o \pm p_i| = Z$. In other embodiments, other combinations of the number of magnetic pole pairs and stator slots are however possible.

Figure 5:
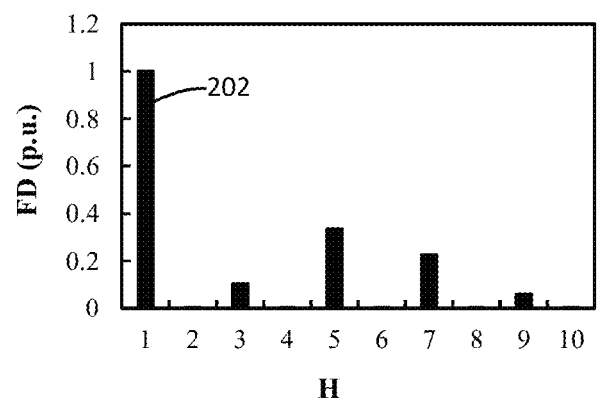
FIG. 5 shows a plot of the harmonic spectrum of a magnetic field generated in the electric machine of FIG. 3.
Figure 6:
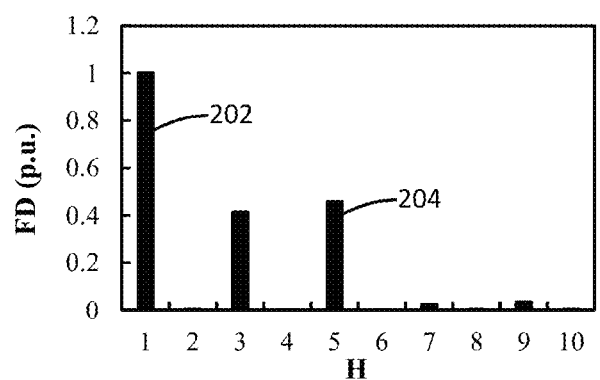
FIG. 6 shows a plot of the harmonic spectrum of another magnetic field generated in the electric machine of FIG. 3.

In one illustrative example, the number of pairs of magnetic poles on the first rotor, $p_o$, is equal to 1, the number of pairs of magnetic poles on the second rotor, $p_i$, is equal to 5 and the number of slots, Z, is equal to 6. The resulting spatial harmonic spectrum of the first magnetic field between the first rotor 104 and the stator 102 is shown in FIG. 5. FIG. 5 shows the harmonic order, H, of the magnetic field spatial variation plotted against normalised flux density, FD. The fundamental spatial harmonic 202 can be seen as the largest component of the magnetic field, and therefore provides a strong level of interaction between the first rotor excitation element 120 and the stator windings 114. An example of the resulting spatial harmonic spectrum of the second magnetic field is shown in FIG. 6, which again shows the harmonic order, H, of magnetic field spatial variation plotted against normalised flux density, FD. The fundamental spatial harmonic 202 having the same spatial frequency as that of the first magnetic field is again present. In FIG. 6, the $5^{th}$ order harmonic 204 is the second strongest component of the magnetic field, and is used to provide the interaction via between the stator 102 and the second rotor.

The first spatial frequency component may therefore be a harmonic order of the magnetic field corresponding to the number of pairs of magnetic poles on the first rotor 104; and the second spatial frequency component may be a harmonic order of the magnetic field corresponding to the number of pairs of magnetic poles on the second rotor 106. The first spatial frequency component may therefore correspond to the $p_o^{th}$ harmonic order, with the second spatial frequency component corresponding to the $p_i^{th}$ harmonic order. In the example of FIGS. 5 and 6, the first spatial frequency component is therefore the first harmonic with the second spatial frequency component being the fifth harmonic. In another embodiment, for example, if the first rotor had 2 pole-pairs it would interact by the 2nd order harmonic rather than the first.

The relative speed of the first and second rotors may be determined by the ratio of the number of pairs of magnetic poles on each. The speed of the second rotor may differ from the first rotor by a factor of $p_o/p_i$, such that $n_i/n_o = p_o/p_i$, where $n_o$ is the speed of rotation of the first rotor and $n_i$ is the speed of rotation of the second rotor.

Referring again to FIGS. 3 and 4, the stator slots 112 are each formed by a gap between the radially extending teeth 110a, 110b extending from the inner and outer surfaces 108a, 108b of the stator yoke 18 to form an outer set of slots and an inner set of slots. The size of the slots formed on the outer surface 108b of the stator 102 may be chosen to optimise the interaction between the stator winding 114 and the second rotor excitation element 126.

As shown in FIG. 4, each of the radially extending teeth 112 may have a corresponding central radial axis extending from the surface of the stator 108a, 108b. Each of the outer set of slots may have a slot size ratio defined by the circumferential or angular gap between the edges of the outer set of teeth (labelled angle 'a' in FIG. 4) and the angular spacing between the radial axes of the outer set of teeth (labelled angle 't' in FIG. 4). The slot size ratio is set to maximise the relative strength of the second frequency component (e.g. that resulting from the stator slots) via which the second rotor 106 and the stator 102 interact.

Figure 7:
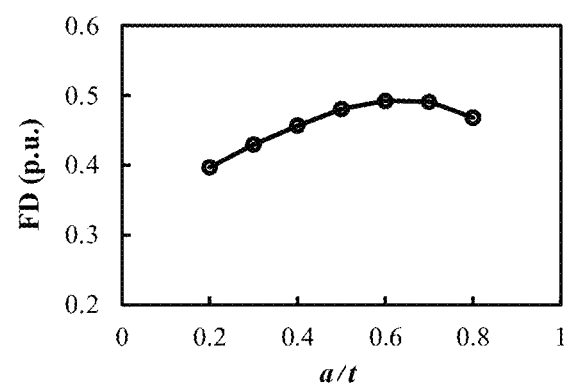
FIG. 7 shows a plot of magnetic flux density of a component of an electric field produced in the electric machine of FIG. 3 as a function of a slot size ratio of the slots provided in a stator of the electric machine.

The slot size ratio is defined by the gap between teeth, a, divided by the tooth axis spacing, t. FIG. 7 shows a plot of the slot size ratio a/t against the flux density of the magnetic field in the airgap between the second rotor 106 and the stator 102. The slot size ratio may be in a range between 0.2 and 0.8. Preferably the slot size ratio may be 0.6. By optimising the slot size ratio the magnitude of the spatial field harmonic used in the interaction between the second rotor and the stator can be enhanced, and the resulting power or torque provided by the second rotor 106 can be maximised. The geometry of the teeth shown in FIGS. 3 and 4 is to be understood as one example only. In other embodiments, other slot size ratios and numbers of teeth may be used.

In the embodiment shown in FIG. 3 the excitation elements 120, 126 of the first and second rotors 104, 106 are formed from permanent magnetic material. The use of permanent magnets may help to provide high torque density and ease of assembly.

In other embodiments, different forms of excitation elements may be used. For example, the excitation elements may be of a reluctance type. In this case, either or both of the excitation elements 120, 126 of the first and second rotors 104, 106 may be formed from a ferromagnetic rotor in which non-permanent magnetic poles are induced. In yet other embodiments, either or both of the first and second rotor excitation elements 120, 126 may comprise consequent pole permanent magnets.

Figures 8A, 8B:
FIGS. 8a, 8b, 8c and 8d show schematic examples of different types of excitation elements that can be used in the dual-rotor electric machine shown in FIG. 3.
Figures 8C, 8D:
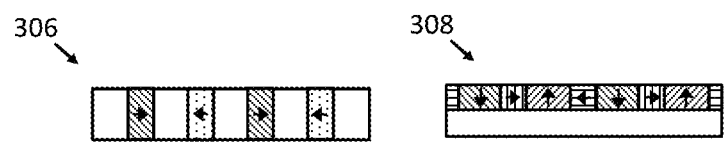

Examples of different types of excitation elements that can be used in the first and second rotors are shown in FIGS. 8a-8d. In each of these figures, permanent magnetic elements are shown as shaded regions with arrows indicating a direction of magnetisation. FIG. 8a shows a consequent-pole permanent magnet array 302. In this example, the number of permanent magnetic elements required is the same as the number of pole-pairs. This arrangement provides a circular flux path together with ferromagnetic material between the permanent magnet elements. FIG. 8b shows an example of a pure reluctance type excitation element 304 with no permanent magnet elements. FIG. 8c shows an interior permanent magnet array 306. In this example, the permanent magnet elements are embedded in the body of the rotor. Finally, FIG. 8c shows Halbach permanent magnet array 308 in which an array of permanent magnet elements having a spatially rotating pattern of magnetisation is provided. The excitation elements 120, 126 of the first and second rotors 104, 106 may be of the same type as shown in FIG. 3, or may be of different types.

Figure 9:
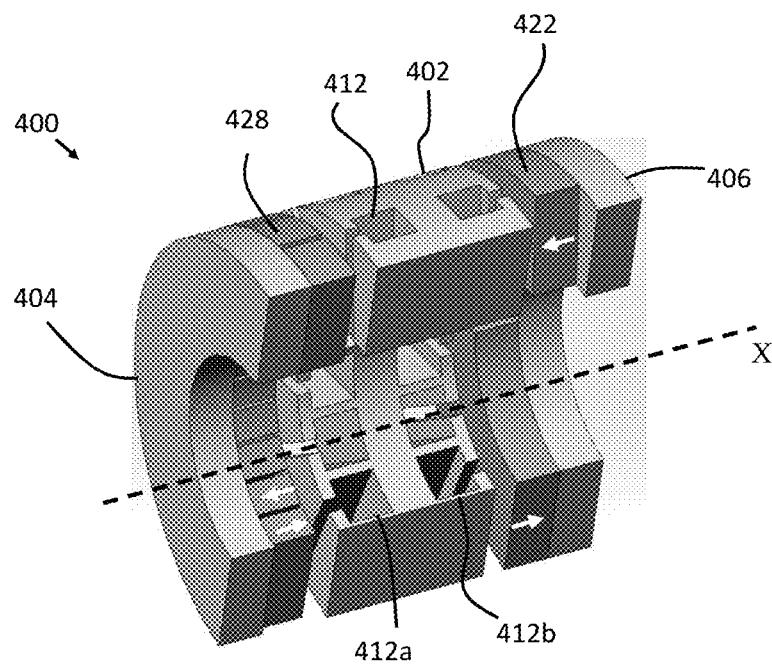
FIG. 9 shows a partial cut-away view of another embodiment of a dual rotor electric machine.

In the embodiment shown in FIG. 3, the stator windings and excitation elements are arranged to interact via a radial magnetic field (e.g. as shown in FIG. 4). In other embodiments, the magnetic field may be axially orientated. An example of such an embodiment is shown in FIG. 9. The electric machine 400 illustrated in FIG. 9 comprises a stator 402, a first rotor 404 and a second rotor 406 and operates in a similar manner to that of FIG. 3. The rotors are arranged to rotate about axis X. In the embodiment of FIG. 9 the first rotor and second rotor 404, 406 are arranged on either side of the stator 402 along the axis of rotation (rather than the first rotor being within the stator and the second rotor being around the stator as in the embodiment of FIG. 3).

The stator 402 comprises slots 412 in which stator windings are located (not shown in FIG. 9). The stator windings are wound toroidally within opposing pairs of slots (e.g. slots labelled 412a and 412b in FIG. 9).

The first and second rotors 404, 406 comprise excitation elements formed from permanent magnet elements 422, 428 similar to those of the embodiment shown in FIG. 3. In the electric machine 400 of FIG. 9 however, the magnetisation direction is in an axial direction, rather than a radial direction as shown by the arrows in FIG. 9. Any feature described above in connection with the embodiment of FIG. 3 may also apply to the embodiment of FIG. 9.

In use, a current may be injected into the stator windings 114 so that an armature field is generated in the air-gaps between the stator 102, 402 and the first and second rotors 104, 404. This field may interact with the magnetic fields produced by the rotor excitation elements to induce a back electromagnetic force and produce a torque that causes the first and second rotors 104, 106, 404, 406 to rotate relative to the stator 102, 402. In this embodiment, the electric machine acts as a motor.

The electric machine 100, 400 may be suitable for use in driving two separate shafts. It may, for example, be used to drive rotation of the propulsors 10a, 10b of a propulsion system 10 as described above.

The electric machine 100, 400 may however be suitable for other purposes. Torque may be applied to the rotors to produce a current in the stator windings so that the electric machine acts as a generator. In other embodiments, the electric machine 100, 400 may act as a combination of a motor and generator. The electric machine 100, 400 may therefore operate in any one of the following modes: a) the first rotor, the second rotor and the stator may act as two separate generators; b) the first rotor, the second rotor and the stator may act as two separate motors; or one of the first rotor and the stator, or the second rotor and the stator, may act as a generator and the other of the first rotor and the stator, or the second rotor and the stator, may act as a motor.

Figure 10:
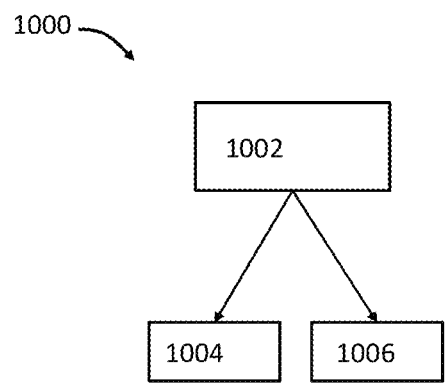
FIG. 10 shows a method of operating a dual-rotor electric machine.

FIG. 10 shows a method 1000 of operating a dual-rotor electric machine. The method comprises providing 1002 a dual rotor electric machine of any embodiment described herein. The method further comprises injecting 1004 a current into the stator windings or applying 1006 torque to the first and second rotors 104, 106; 404; 406 such that the first rotor 104; 404 is arranged to rotate about the rotational axis X in an opposite direction and at a different speed to the second rotor 106; 406. When the rotors are rotated in this way the first rotor may interact with the stator via a magnetic field spatial frequency that is different to that which provides the interaction between the second rotor and the stator as described elsewhere herein.

In one example embodiment, the electric machine 100, 400 may be used to link the spools of a two-spool gas turbine engine in which low and high pressure turbines are coupled to independent shafts (i.e. spools) to drive respective low and high pressure compressors independently of each other.

Figure 11:
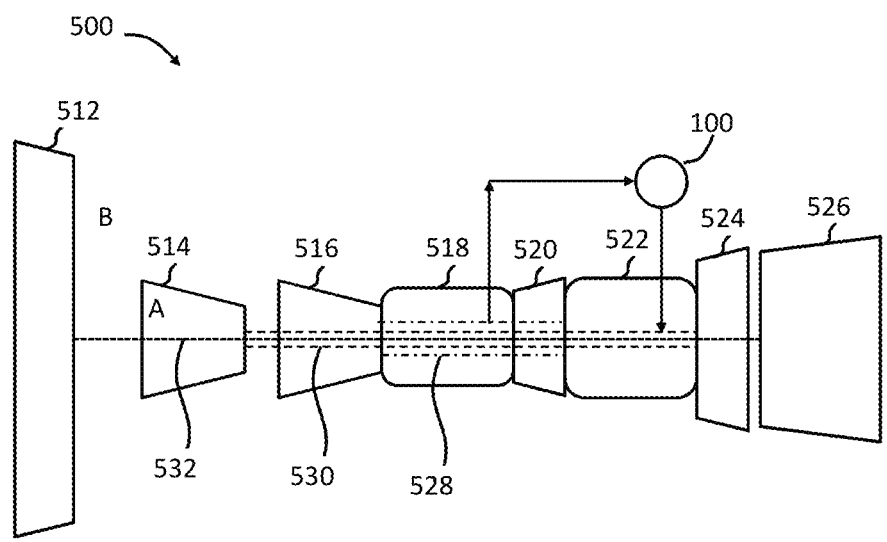
FIG. 11 shows a two-spool gas turbine engine comprising the dual-rotor electric machine of FIG. 3.

An example of a two-spool gas turbine engine is illustrated in FIG. 11. With reference to FIG. 11, a gas turbine engine is generally indicated at 500. The gas turbine engine 500 comprises, in axial flow series, a propulsive fan 512, a first compressor in the form of an intermediate pressure compressor 514, a second compressor in the form of a high-pressure compressor 516, a first constant pressure combustor 518, a first turbine in the form of a high-pressure turbine 520, a second constant pressure combustor 522, a second turbine in the form of an intermediate pressure turbine 524, and a low-pressure turbine 526.

The gas turbine engine 500 works in the conventional manner so that air is accelerated by the fan 512 to produce two air flows: a first air flow A into the intermediate pressure compressor 514 and a second air flow B which passes through a bypass duct to provide propulsive thrust. The intermediate pressure compressor 514 compresses the air flow directed into it before delivering that air to the high pressure compressor 516 where further compression takes place.

The compressed air exhausted from the high-pressure compressor 516 is directed into the first combustor 518 where it is mixed with fuel and the mixture combusted. The resultant hot combustion products then expand through, and thereby drive, the high pressure turbine 520. Exhaust from the high pressure turbine 520 is directed into the second combustor 522 where further combustion takes before expanding through, and thereby driving, the intermediate and low-pressure turbines 524, 526 before being exhausted to provide additional propulsive thrust. The high 520, intermediate 524 and low 526 pressure turbines drive respectively the high pressure compressor 516, intermediate pressure compressor 514 and fan 512, each by suitable independently rotatable interconnecting relatively high, intermediate and low pressure shafts represented by dotted lines 528, 530, 532 respectively.

The dual rotor electric machine 100 may be coupled to the high and intermediate pressure shafts 528, 530 as illustrated in FIG. 11. One of the first and second rotors 104, 106 of the electric machine 100 may be coupled to one of the high and intermediate pressure shafts 528, 530, with the other of the first and second rotors 104, 106 coupled to the other of the high and intermediate pressure shafts 528, 530. The first and second rotors may be coupled to the shafts 528, 530 directly or via a gearbox. The electric machine 100 may be arranged to transfer power from one of the shafts to the other, add power to one or both of the shaft or generate power from one of both of the shafts.

The electric machine 100 may be used for other purposes in which a single electric machine with two independently rotating rotors is coupled to drive or by driven by a system having two independently rotating shafts. The present disclosure is not therefore limited to the embodiments described herein.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A dual-rotor electric machine, comprising:
a stator having one or more slots and one or more stator windings, wherein the stator comprises an outer set of teeth extending radially from an outer surface of the stator, wherein the one or more slots comprises an outer set of slots defined by circumferential gaps between the outer set of teeth, wherein each of the outer set of teeth have a corresponding central radial axis extending from the outer surface of the stator, and the outer set of slots have a slot size ratio defined by the angle (a) between the edges of the outer set of teeth and the angle (t) between the radial axes of the outer set of teeth, wherein the slot size ratio is defined by the angle (a) between each of the outer set of teeth divided by the angle (t) between the radial axes of the outer set of teeth, wherein the slot size ratio is in a range between 0.2 and 0.8;

a first rotor arranged to rotate relative to the stator with an insulating gap therebetween, the first rotor comprising a first rotor excitation element having one or more magnetic pole pairs arranged to interact with the stator windings, the first rotor configured to rotate about an axis; and a second rotor arranged to rotate relative to the stator with an insulating gap therebetween, the second rotor comprising a second rotor excitation element having one or more magnetic pole pairs arranged to interact with the stator windings, the second rotor being configured to rotate about the axis, wherein one or both of the first and second rotor excitation elements comprises a permanent magnetic material, the number of magnetic pole pairs on the first rotor is different from the number of magnetic pole pairs on the second rotor, and the first rotor is arranged to rotate about the axis in an opposite direction and at a different speed to the second rotor.

2. The dual-rotor electric machine of claim 1, wherein:
the first rotor excitation element is arranged to interact with the stator windings via a first rotor magnetic field in the insulating gap between the first rotor and the stator, the second rotor excitation element is arranged to interact with the stator windings via a second rotor magnetic field in the insulating gap between the second rotor and the stator, and wherein the magnetic fields in each of the insulating gaps have a plurality of spatial frequency components, and wherein:

the interaction between the first rotor excitation element and the stator windings is via a first spatial frequency component, and the interaction between the second rotor excitation element and the stator windings is via a second spatial frequency component, wherein the first frequency component has a different spatial frequency to the second spatial frequency component.

3. The dual-rotor electric machine of claim 2, wherein:
the first spatial frequency component is a spatial harmonic order of the magnetic field corresponding to the number of pairs of magnetic poles on the first rotor; and the second spatial frequency component is a spatial harmonic order of the magnetic field corresponding to the number of pairs of magnetic poles on the second rotor.

4. The dual-rotor electric machine of claim 2, wherein:
either of the first or the second spatial frequency components corresponds to a spatial harmonic resulting from:
the distribution of stator windings around the stator, the position of each stator winding, and/or the number of turns in each winding; and the other of the first or second spatial frequency components corresponds to a higher order spatial harmonic of the respective magnetic field, the higher order spatial harmonic resulting from the distribution of slots formed in the stator.

5. The dual-rotor electric machine of claim 1, wherein:
the number of pairs of magnetic poles on the second rotor is greater than the number of pairs of magnetic poles on the first rotor, and wherein the first rotor is arranged to rotate about the axis at a greater speed compared to the second rotor.

6. The dual-rotor electric machine of claim 1, wherein:
the number of slots in the stator, Z, the number of magnetic pole pairs on the first rotor, $p_o$, and the number of magnetic pole pairs on the second rotor, $p_i$, are given by the expression $|p_o \pm p_i|=Z$.

7. The dual-rotor electric machine of claim 1, wherein:
the slot size ratio is set to maximise a relative strength of the spatial frequency component of a magnetic field via which the second rotor excitation element and the stator windings interact.

8. The dual-rotor electric machine of claim 1, wherein:
the slot size ratio is 0.6.

9. The dual-rotor electric machine of claim 1, wherein:
the first rotor is located at least partially within the stator and the second rotor at least partially surrounds the stator; or
the first rotor and the second rotor are arranged on either side of the stator in a direction along the axis of rotation (X).

10. The dual-rotor electric machine of claim 1, wherein:
one or both of the first and second rotor excitation elements comprises one or more permanent magnet elements.

11. The dual-rotor electric machine of claim 1, wherein:
the one or more stator windings comprise a plurality of polyphaser windings of electrically conducting wires.

12. The dual-rotor electric machine of claim 1, wherein any one of:
the first rotor, the second rotor and the stator are configured to act as two separate generators;
the first rotor, the second rotor and the stator are configured to act as two separate motors; or
one of the first rotor and the stator, or the second rotor and the stator, is configured to act as a generator and the other of the first rotor and the stator, or the second rotor and the stator, is configured to act as a motor.

13. A dual-rotor electric machine, comprising:
a stator having one or more slots and one or more stator windings, wherein the stator comprises an outer set of teeth extending radially from an outer surface of the stator, wherein the one or more slots comprises an outer set of slots defined by circumferential gaps between the outer set of teeth, wherein each of the outer set of teeth have a corresponding central radial axis extending from the outer surface of the stator, and the outer set of slots have a slot size ratio defined by the angle (a) between the edges of the outer set of teeth and the angle (t) between the radial axes of the outer set of teeth, wherein the slot size ratio is defined by the angle (a) between each of the outer set of teeth divided by the angle (t) between the radial axes of the outer set of teeth, wherein the slot size ratio is in a range between 0.2 and 0.8;
a first rotor arranged to rotate relative to the stator with an insulating gap therebetween, the first rotor comprising a first rotor excitation element having one or more magnetic pole pairs arranged to interact with the stator windings, the first rotor configured to rotate about an axis;
a second rotor arranged to rotate relative to the stator with an insulating gap therebetween, the second rotor comprising a second rotor excitation element having one or more magnetic pole pairs arranged to interact with the stator windings, the second rotor being configured to rotate about the axis,
wherein the number of magnetic pole pairs on the first rotor is different from the number of magnetic pole pairs on the second rotor,
wherein one or both of the first and second rotor excitation elements comprises a permanent magnetic material,
wherein the first rotor excitation element is arranged to interact with the stator windings via a first rotor magnetic field in the insulating gap between the first rotor and the stator, and the second rotor excitation element is arranged to interact with the stator windings via a second rotor magnetic field in the insulating gap between the second rotor and the stator, and
wherein the first rotor excitation element interacts with the stator via a different magnetic field spatial harmonic compared to the interaction between the second rotor excitation element and the stator such that the first rotor is arranged to rotate about the axis in an opposite direction and at a different speed to the second rotor.

14. The dual-rotor electric machine of claim 13, wherein:
the magnetic field spatial harmonic via which the first rotor excitation element and stator winding interact is a magnetic field spatial harmonic resulting from the distribution of stator windings around the stator; and
the magnetic field spatial harmonic via which the second rotor excitation element and the stator winding interact is a magnetic field spatial harmonic resulting from the distribution of the slots formed in the stator.

15. An aircraft propulsion system comprising:
first and second propulsors; and
the dual-rotor electric machine of claim 1,
wherein one of the first and second rotors is coupled to one of the first and second propulsors, with the other of the first and second rotors coupled to the other of the first and second propulsors whereby the electric machine is configured to drive the first and second propulsors.

16. A method of operating a dual-rotor electric machine, comprising:
providing the dual-rotor electric machine of claim 1; and
injecting a current into the stator windings or applying torque to the first and second rotors such that the first rotor rotates about the axis in an opposite direction and at a different speed to the second rotor.

17. The dual-rotor electric machine of claim 4, wherein the spatial harmonic is a fundamental harmonic.

* * * * *